(12) United States Patent
Alkalay

(10) Patent No.: US 9,827,514 B2
(45) Date of Patent: Nov. 28, 2017

(54) FLUID FLOW ACCESSORY

(71) Applicant: Yamit Filtration & Water Treatment Ltd., Shaar Efraim (IL)

(72) Inventor: Uri Alkalay, Even-Yehuda (IL)

(73) Assignee: YAMIT FILTRATION & WATER TREATMENT LTD., Shaar Efraim (IL)

( * ) Notice: Subject to any disclaimer, the term of this patent is extended or adjusted under 35 U.S.C. 154(b) by 416 days.

(21) Appl. No.: 14/629,505

(22) Filed: Feb. 24, 2015

(65) Prior Publication Data

US 2016/0243475 A1    Aug. 25, 2016

(51) Int. Cl.
   *B01D 35/30*   (2006.01)
   *F16L 55/07*   (2006.01)
   *F16L 23/02*   (2006.01)
   *B01D 24/46*   (2006.01)
   *B01D 24/24*   (2006.01)
   *F16L 15/08*   (2006.01)
   *F16L 23/00*   (2006.01)

(52) U.S. Cl.
   CPC ......... *B01D 24/4626* (2013.01); *B01D 24/24* (2013.01)

(58) Field of Classification Search
   CPC .... B01D 35/30; B01D 24/4626; B01D 24/24; F16L 15/08; F16L 23/003; F16L 23/02; F16L 55/07
   USPC ............. 210/456, 163, 167.1, 170.03, 172.2, 210/172.6, 513, 473, 477, 482
   See application file for complete search history.

(56) References Cited

U.S. PATENT DOCUMENTS 3,498,462 A * 3/1970 Larrowe ............... B01D 24/165
                                                210/289
4,579,659 A * 4/1986 Eades .................... B01D 24/12
                                                210/293

* cited by examiner

*Primary Examiner* — Madeline Gonzalez
(74) *Attorney, Agent, or Firm* — Mark M. Friedman

(57) ABSTRACT

A fluid flow accessory is provided for coupling to an opening formed in a wall portion. The fluid flow accessory includes a cup having an edge configured to engage a first surface of the wall portion; and a coupling member including coupling arrangement configured for coupling to the cup and a first flange configured to be inserted through the opening in a first orientation thereof with respect to the opening, and for abutting against a second surface of the wall portion in a second orientation thereof with respect to the opening, and a fastening member protruding towards the first flange and being disposed such that in the second orientation it engages a segment of the wall portion thereby limiting the displacement of the coupling member into the first orientation.

18 Claims, 12 Drawing Sheets

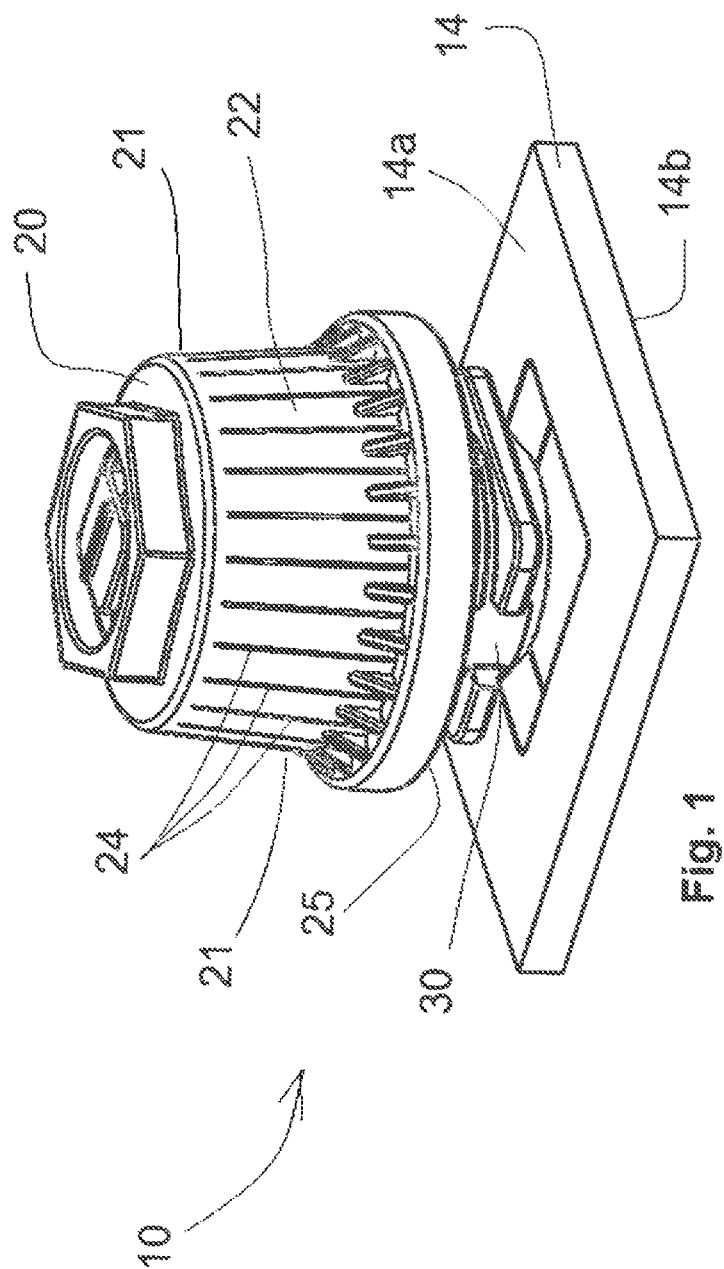

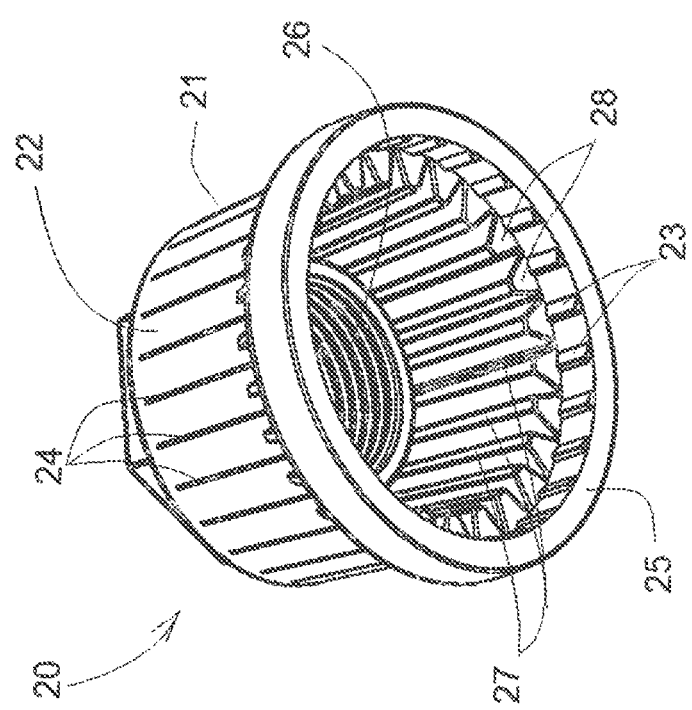

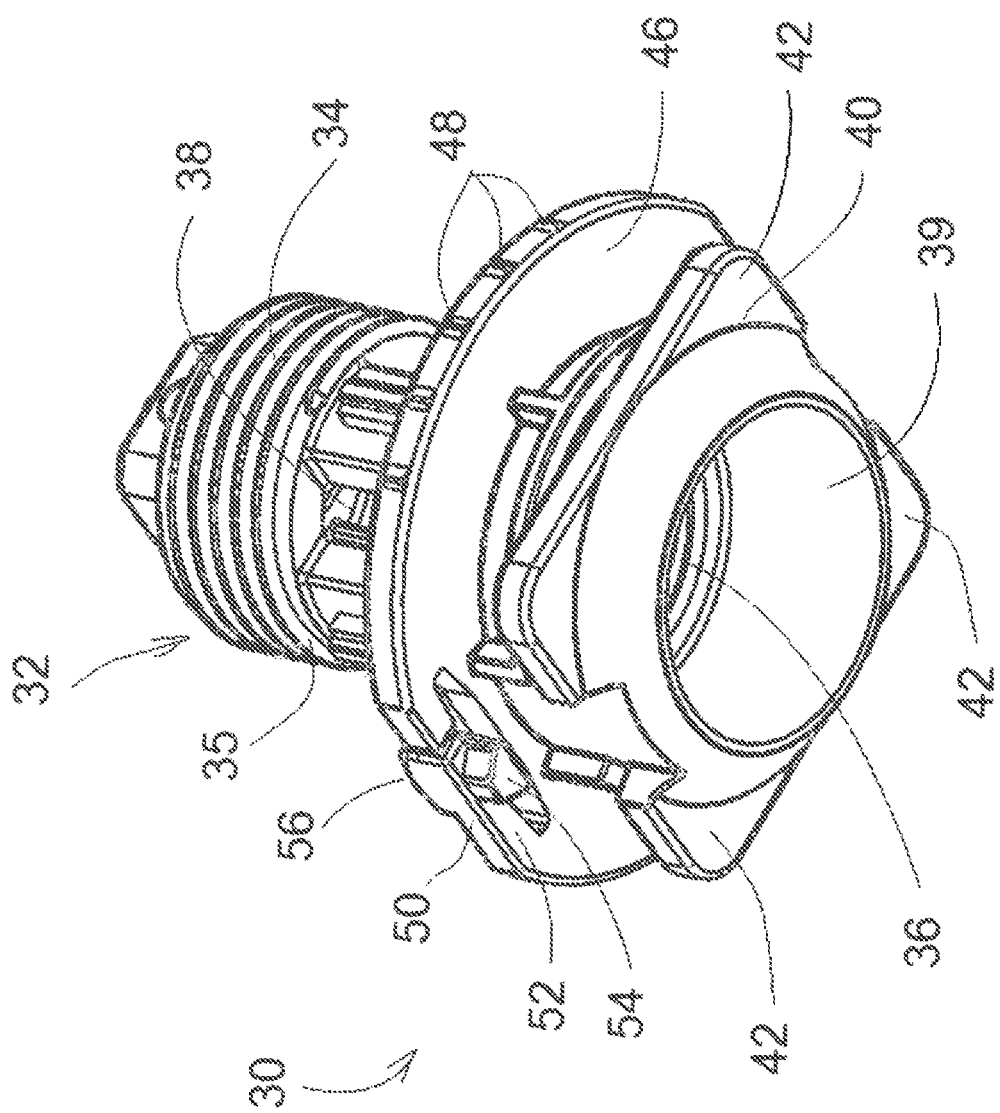

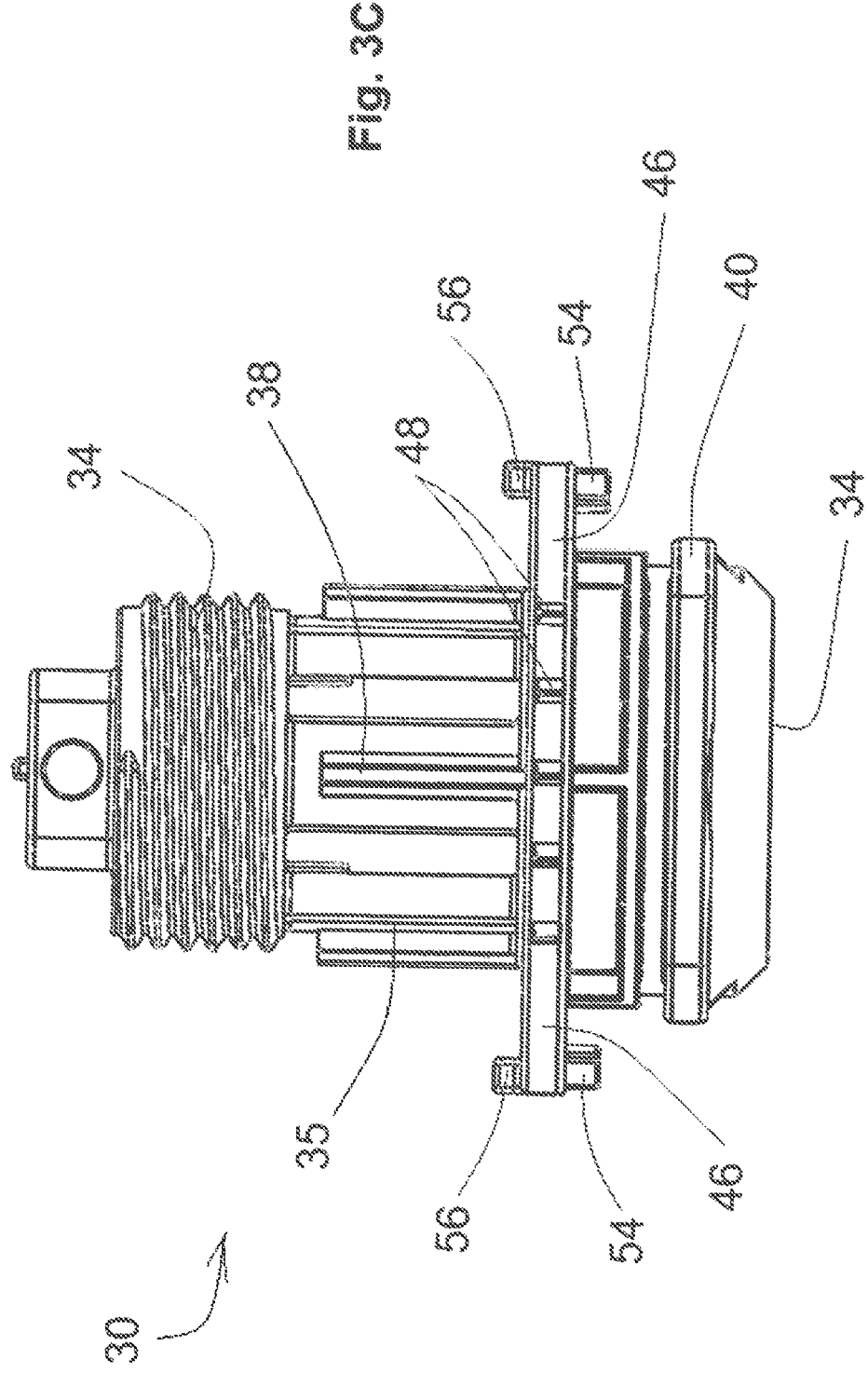

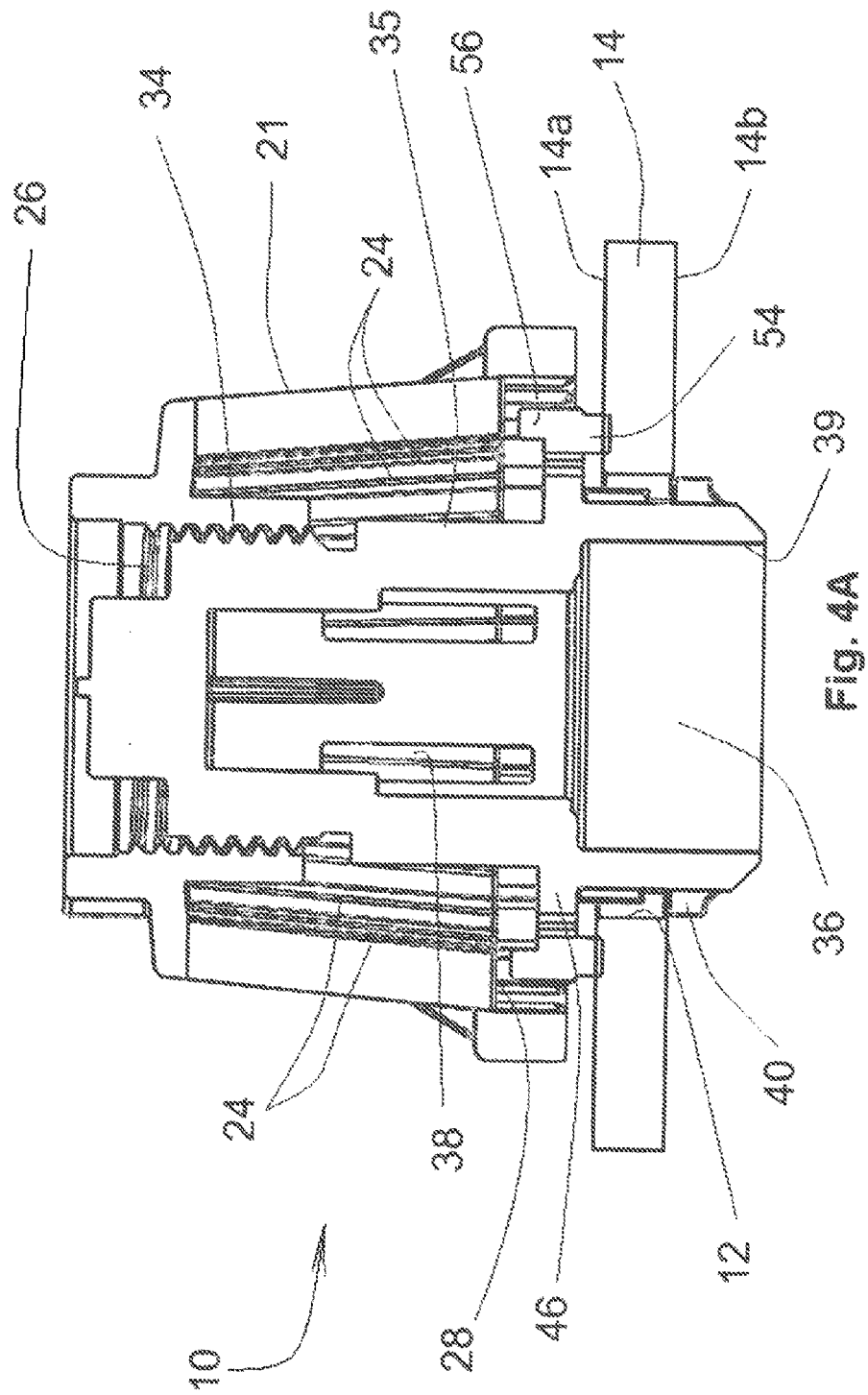

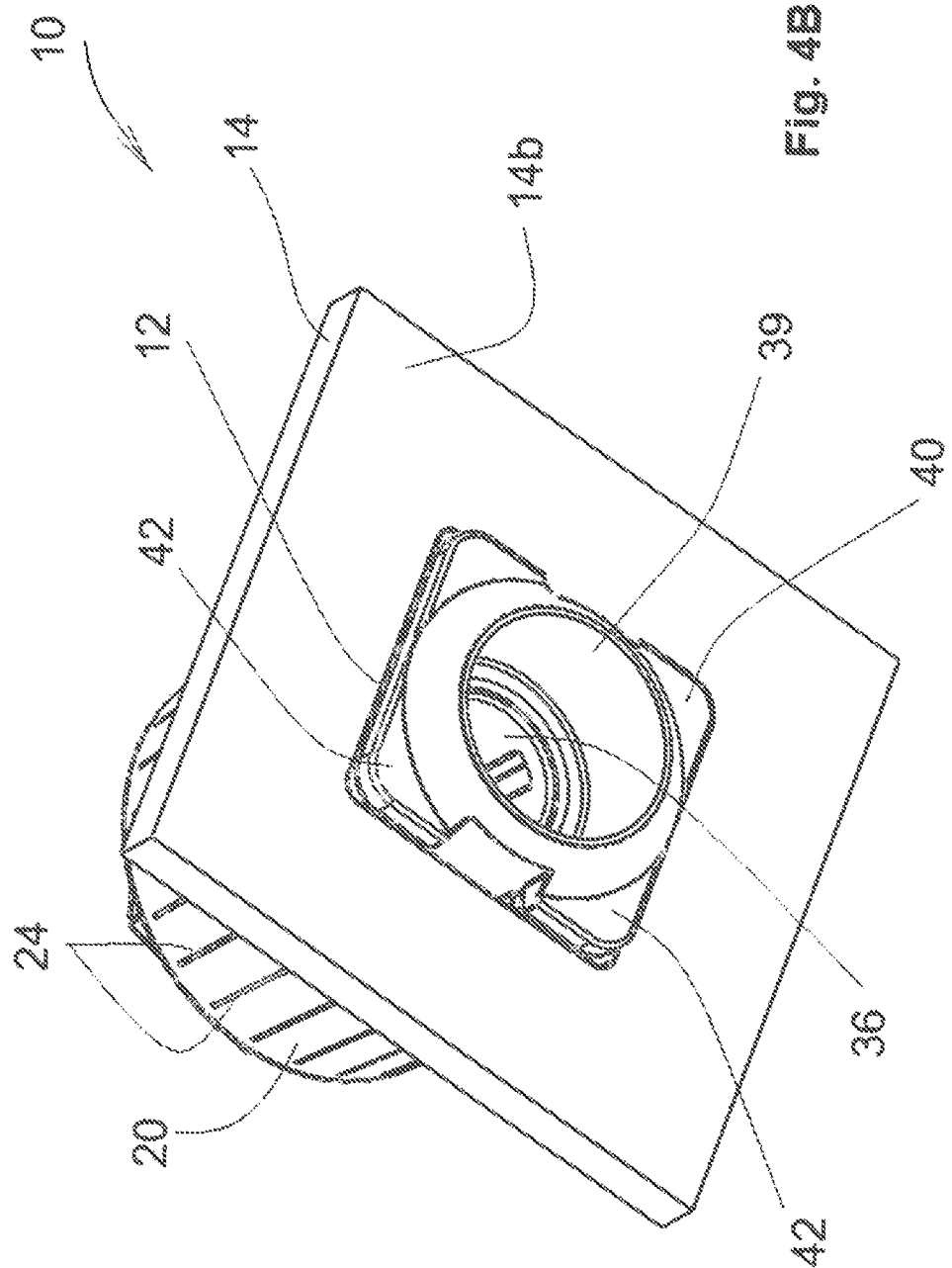

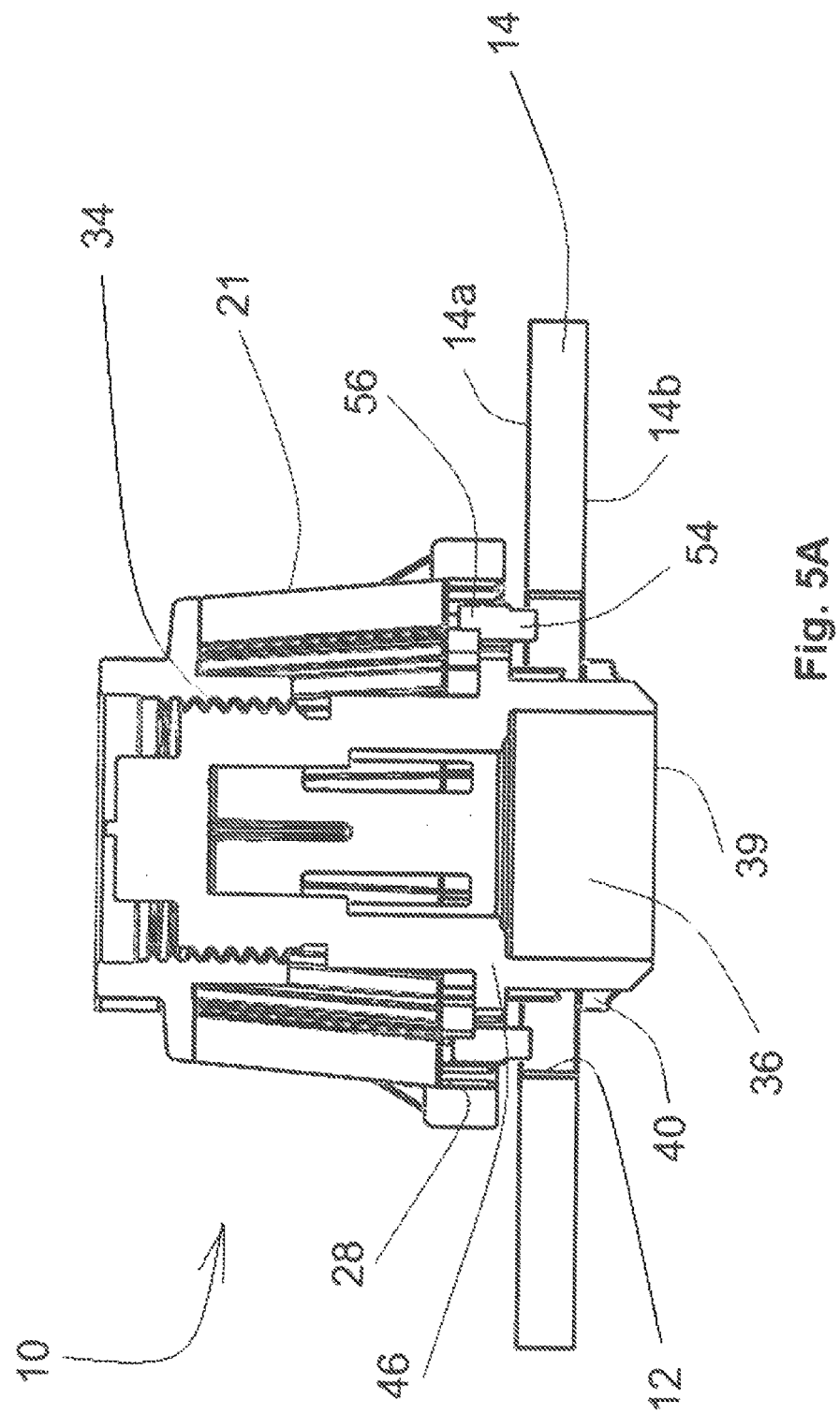

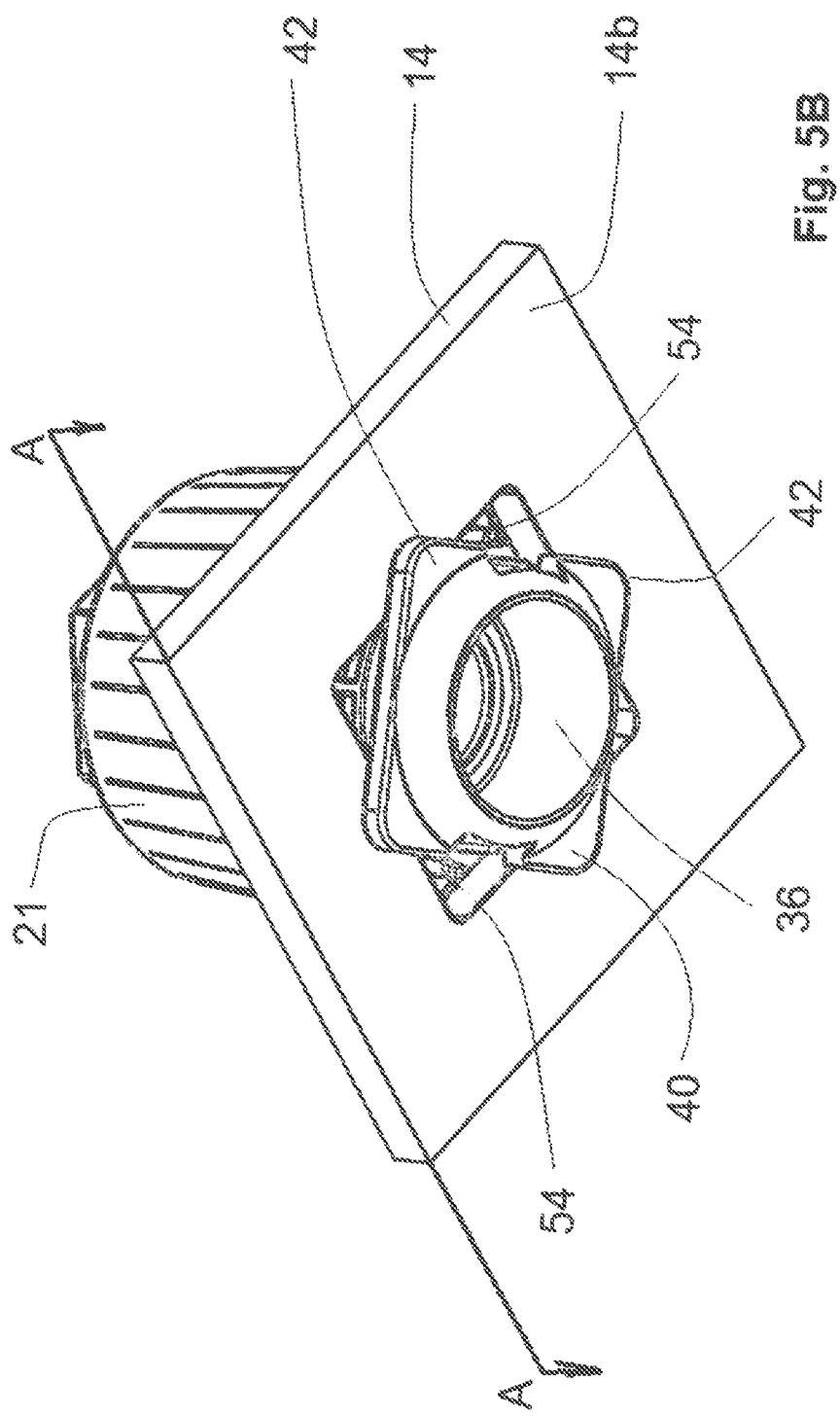

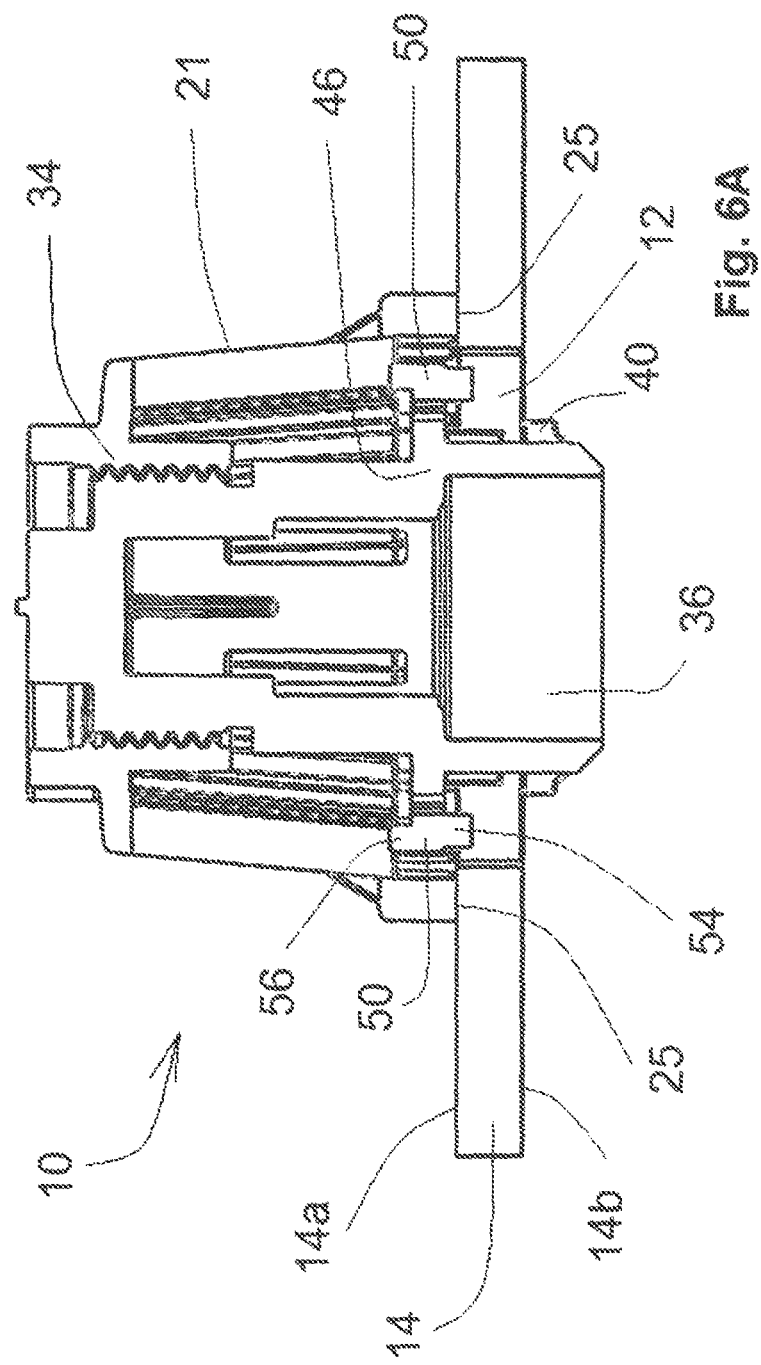

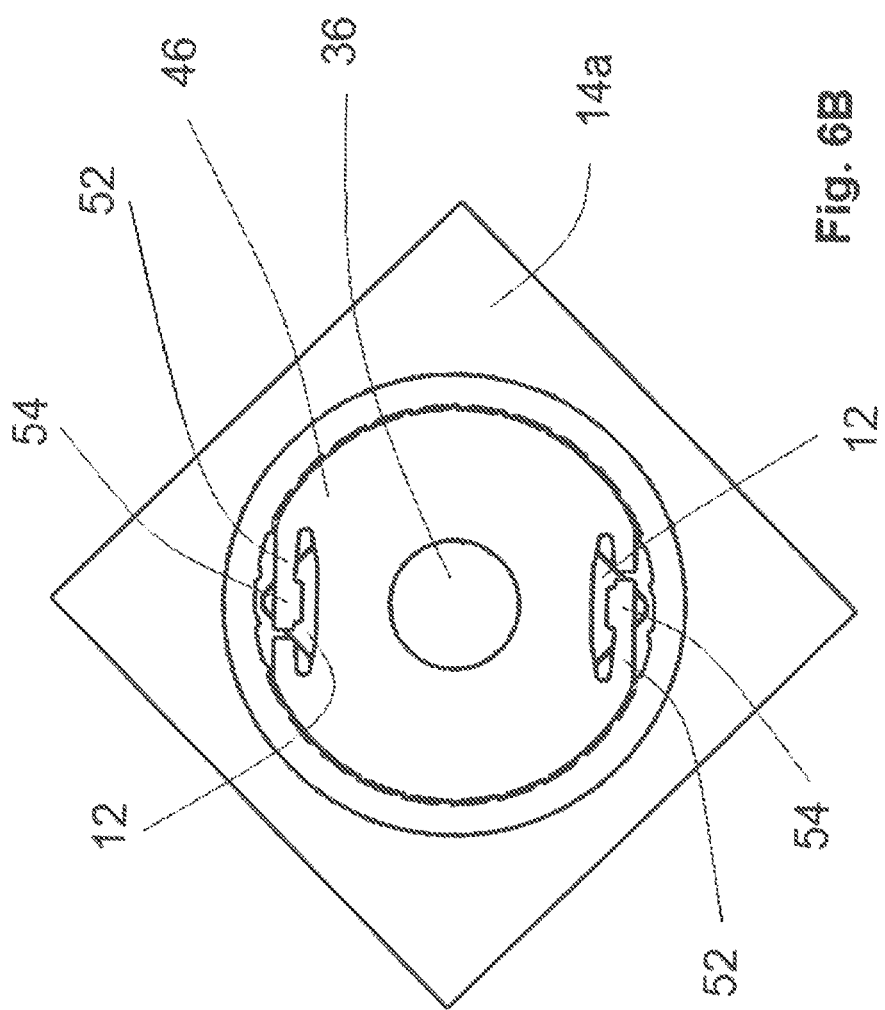

FLUID FLOW ACCESSORY

TECHNOLOGICAL FIELD

The presently disclosed subject matter relates to a fluid flow accessory in general and in particular to a fluid filtering accessory for filtering fluids transferred between a first fluid path to a second fluid path through an opening formed in a wall portion therebetween.

BACKGROUND

US 20110114195 discloses a union coupling having a removable screen is disclosed. The union coupling includes a pipe joint, a fitting that receives the screen, and a collar which clamps the fitting to the pipe joint. In one form, the fitting has an inner surface that defines a passage through the fitting and a pocket formed in the inner surface. The screen has a transverse extension that is received at least in part in the pocket with engagement of the transverse extension and pocket restricting passage of the screen past a predetermined position in the passage. A union coupling having a fitting comprising a fitting body with an outward flange and a shoulder element with an outward flange is also provided. The shoulder element is connected to the fitting body to captivate a collar between the outward flanges of the fitting so that the collar does not become separated from the fitting body.

GENERAL DESCRIPTION

There is provided in accordance with an aspect of the presently disclosed subject matter a fluid flow accessory for controlling flow of fluids transferred between a first fluid containing structure and a second fluid containing structure through an opening formed in a wall portion disposed between the first and the second fluid containing structures and having a first surface facing the first fluid containing structure and a second surface facing the second fluid containing structure. The fluid flow accessory includes a cup having an edge configured to engage the first surface of the wall portion; and a coupling member including coupling arrangement configured for coupling to the cup and a first flange configured to be inserted through the opening in a first orientation thereof with respect to the opening, and for abutting against the second surface of the wall portion in a second orientation thereof with respect to the opening, and a fastening member protruding towards the first flange and being disposed such that in the second orientation it engages a segment of the wall portion thereby limiting the displacement of the coupling member into the first orientation.

The coupling member is selectively shifted between the first orientation and the second orientation by rotation thereof when disposed inside the opening.

The coupling arrangement can be configured for threaded engagement between the cup and the coupling member.

The cup can include a shoulder portion defined about the inner edge thereof, and being configured urges the fastening member towards the first flange when the cup can be fastened to the coupling member, such that in the second orientation the fastening member engages an inner edge of the opening, precluding thereby the displacement of the first flange back to the first orientation.

In the second orientation, and after tightening of the threaded engagement, the wall portion can be pressed between the first flange of the coupling member and the edge of the cup.

The fastening member can be defined on a second flange laterally protruding from the coupling member and configured to abut against the first surface of the wall portion, precluding thereby further insertion of the stop member through the opening.

The cup includes a filtering surface configured to filter fluid.

The filtering surface can be configured to block gravel of a gravel filter from entering the second fluid containing structure.

The edge can be configured to sealingly engage the wall portion.

The shoulder portion can include a plurality of ribs defined along an inner surface of the cup.

The coupling member can include an elongated body configured to be inserted inside the cup and having a screw thread defined on a surface thereof, the screw thread being configured to engage a corresponding screw thread defined on an inner surface of the cup. The elongated body can include a head portion configured to protrude out of said cup such that coupling the coupling member to the cup can be carried out by rotation of the hexagonal head with respect to the cup.

The cup and the coupling member can further include an anti-reverse mechanism configured to preclude back rotation of the cup in a direction to unscrew the screw thread.

The anti-reverse mechanism can include a plurality of protrusions defined about the circumference of a second flange of the coupling member configured to engage corresponding protrusions defined on an inner portion of the cup.

The first flange can be shaped such that in the second orientation the first flange projects out of the perimeter of the opening. The shape has at least one corner and can be sized such that in the first orientation the first flange can be inserted through the opening and in the second orientation the corner projects out the perimeter of the opening.

The fastening member can include a flexible arm coupled to the coupling member, and a stop member downwardly protruding from the flexible arm such that in the first orientation the stop member can be urged upwardly by the first surface of the wall portion. The flexible arm includes a raised portion protruding therefrom in an opposite direction from the stop member, such that when the cup can be tightened onto the coupling member the raised portion can be urged by a shoulder portion of the cup towards the first flange.

The first flange can be in the form of a square, and the opening can be in the form of a corresponding square and wherein the stop member can be configured to engage, in the second orientation, a corner of the opening.

There is provided in accordance with another aspect of the presently disclosed subject matter a method for installing a fluid flow accessory for filtering fluids transferred between a first fluid containing structure and a second fluid containing structure through an opening formed in a wall portion disposed between the first and the second fluid containing structures and having a first surface facing the first fluid containing structure and a second surface facing the second fluid containing structure. The method includes providing a cup having an edge configured to engage the first surface of the wall portion; coupling to the cup a coupling member having a coupling arrangement configured to fasten the cup to the coupling member by rotation thereof with respect to the coupling member, the coupling member having a first flange configured to be inserted through the opening in a first orientation of the first flange with respect to the opening, and for abutting against the second surface of the wall portion in a second orientation of the first flange with respect to the opening and a fastening member protruding towards the first flange and being disposed such that in the second orientation it engages a segment of the wall portion thereby limiting the rotation of the coupling member inside the opening; inserting the first flange into the opening while the first flange can be in the first orientation; and rotating the cup in a direction such that the first flange can be shifted to the second orientation and further rotating the cup in the direction until the fastening member engages the segment of the wall portion and the edge engages the first surface.

For the purpose of conciseness of description, use will be made herein to orientation-related terms such as "top", "bottom", "upwards", "downwards" and the like. These terms are used in reference to an orientation as illustrated in FIG. 1. It should be appreciated however that such terms do not carry any implication as to the orientation in which the final product is to be used, which may in some applications be inverted or otherwise reoriented

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1 is a perspective view of a filter in accordance with an example of the presently disclosed subject matter;

FIG. 2 is a bottom perspective view of the filtering cup of the filter of FIG. 1;

FIG. 3A is a bottom perspective view of the coupling member of the filter of FIG. 1;

FIG. 3C is a side view of the coupling member of FIG. 3A, in a second orientating thereof;

FIG. 4A is a side sectional view of the filter of FIG. 1, in the first orientating of the coupling member;

FIG. 4B is a bottom perspective view of the filter of FIG. 4A;

FIG. 5A is a side sectional view of the filter of FIG. 1, in the second orientating of the coupling member;

FIG. 5B is a bottom perspective view of the filter of FIG. 5A;

FIG. 6A is a side sectional view of the filter of FIG. 1, in the secured position thereof;

FIG. 6B is a top sectional view of the filter taken along lines A-A of FIG. 5B.

DETAILED DESCRIPTION

Figure 3B:
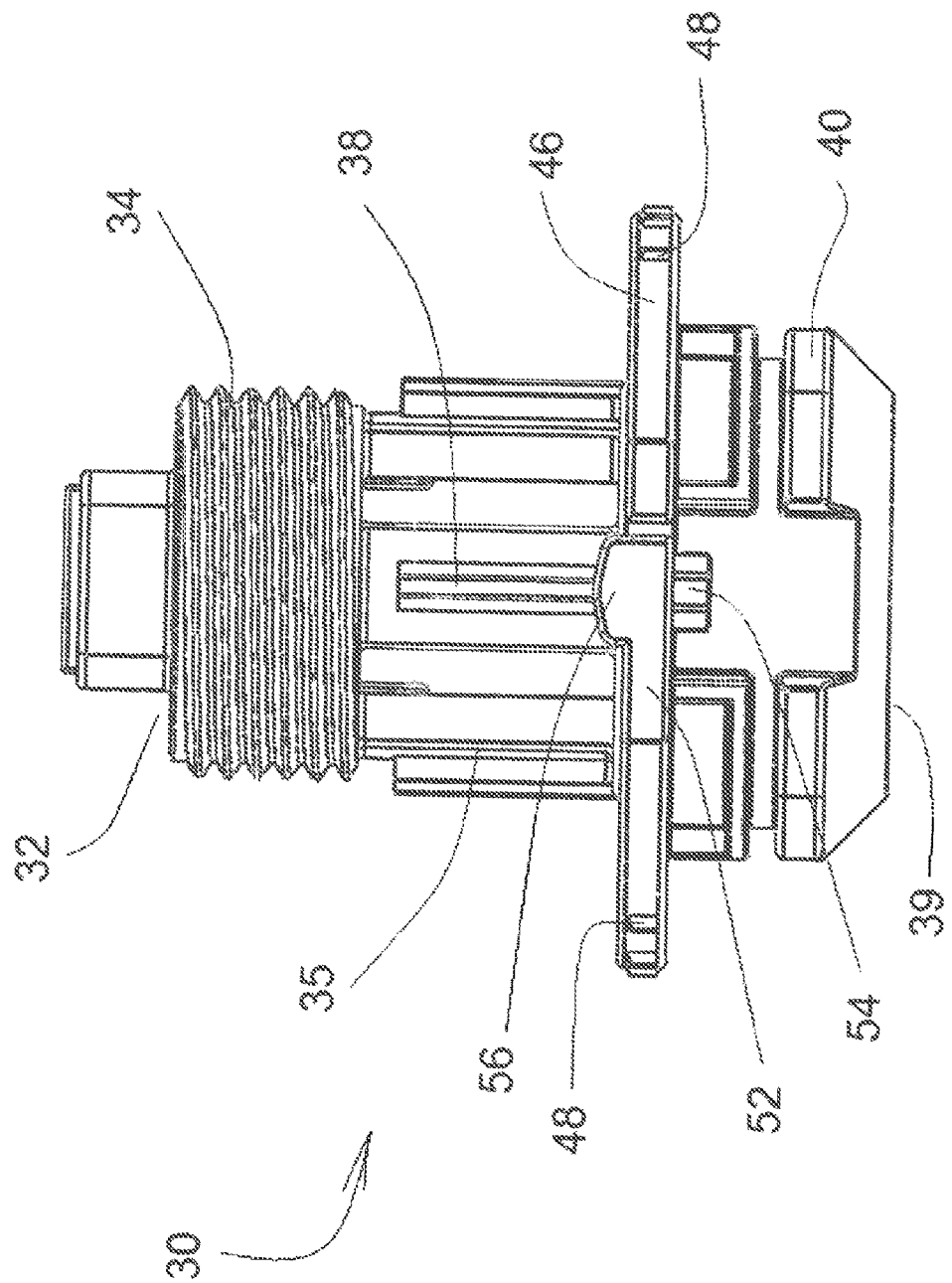
FIG. 3B is a side view of the coupling member of FIG. 3A, in a first orientating thereof.

FIGS. 1 through 3 show a fluid flow accessory, here illustrated as a filter 10 for filtering fluids transferred from a first reservoir to a second reservoir. The filter 10 is configured to be mounted in an opening 12 formed in a wall portion 14 disposed between the first fluid path and a second fluid path. According to the illustrated example the filter is configured to be mounted inside a container of a gravel filter. The filter 10 can be mounted in an opening formed in a wall portion of the container, allowing thereby fluid flow from the container towards a pipe coupled to the opening. The filter is configured such that gravel is blocked thereby and does not enter the pipe, while fluid can freely flow therethrough. This way, the fluid is filtered by the gravel and can then flow out of the gravel container towards.

According to other examples, the fluid flow accessory can be any other accessory such as a filter, a valve, a fluid additive dispenser, etc. The filter 10 includes a filtering cup 20 having an outer wall 21, such as a conical wall, defining a filtering surface 22 configured to filter the fluid flows therethrough, and an edge 25 configured to engage the wall portion 14. The edge 25 can be configured to sealingly engage the wall portion 14. According to the present example the edge 25 can be configured allow fluid flow between the wall portion 14 and the edge 25, however such which precludes displacement of the gravel and dirt thorough the opening.

It is appreciated that the cup 20 can be configured such that the gap between the edge 25 and the wall portion 14 is no more than the size of the objects which the filter is intended to filter.

The filtering surface 22 according to an example, includes a plurality of slits 24 each configured to allow fluid flow therethrough, while precluding therethrough various undesirable objects, such as dirt, rocks etc., or gravel as in the present example. It is appreciated that the outer wall can otherwise be a cylindrical wall a square wall, etc.

The filtering cup 20 further includes a shoulder portion 28 defined about the inner circumference of the outer wall 21, the purpose of which is explained hereinafter in detail. According to the illustrated example the inner surface of the filter cup includes a plurality of ribs 27 defined along the sides of the slits 24. Thus, the shoulder portion 28 is defined by the end of the ribs 27.

The filter 10 further includes a coupling member 30 configured for coupling the filtering cup 20 to the opening 12 of the wall portion 14, and includes a coupling arrangement 32 for coupling thereof to the filtering cup 20. According to the illustrated example, the coupling arrangement 32 includes a screw thread 34 defined on an outer surface thereof and being configured to be coupled to a corresponding screw thread 26 defined on an inner surface of the filtering cup 20.

The coupling member 30 can be an elongated body 35 being configured to be inserted inside the filtering cup 20 such that the screw thread 34 is defined on one end thereof and is configured to engage a corresponding screw thread 24 defined on an inner surface at the top of the filtering cup 20. The elongated body 35 defining an inner flow path 36 having an outlet port 39 at a second end thereof, and formed with apertures 38 providing fluid communication between the slits 24 of the filtering surface 22 and the inner flow path 36 such that fluid can flow from the first reservoir towards the second reservoir through the filtering surface 22 of the cup 20 and the inner flow path 36 of the coupling member 30.

The coupling member 30 is further provided with a first flange 40, defined at the second end of the elongated body 35 about the outlet port 39. The first flange 40 is so configured with respect to the opening 12, such that it can be inserted therethrough in a first orientation thereof with respect thereto, while abutting against the perimeter of the opening 12, in a second orientation thereof with respect thereto.

According to the illustrated example, the first flange 40 is in the form of a square, and the opening 12 is in the form of a corresponding square having dimension such that, in a first orientation thereof, when the first flange 40 is aligned with the opening 12 it can be inserted therethrough. When the coupling member 30 is however rotated about the central axis thereof the square flange 40 is no longer aligned with the square opening 12. In this position, the coupling member 30 is in the second orientation thereof, and the square flange 40 cannot be displaced through the square opening 12 as the corners 42 thereof abut against the perimeter of the square opening 12.

It is appreciated that the size of the square flange 40 can such that the diagonal thereof is larger than the width and the length of the square opening 12. This way, as shown in FIG. 5B, when the coupling member 30 is rotated until the square flange 40 is aligned with the width of the opening 12 the corners 42 abut against the sides of the opening 12.

It is appreciated that the opening 12 and the first flange 40 can be formed in various corresponding shapes, such which allows insertion of the first flange through the opening in a first orientation and engagement of the flange with the perimeter of the opening in a second orientation. For example, the opening and the first flange can be rectangular, such that only when the first flange is aligned with the opening it can be inserted therethrough. Alternatively, the opening and the first flange can be triangular or can have any other shapes having at least one corner sized such that in the first orientation the first flange can be inserted through the opening and in the second orientation the corner projects out the perimeter of the opening. According to another example the first flange can be an ellipse configured to be inserted inside a corresponding.

It is further appreciated that according to other examples shifting the coupling member between the first orientation and the second orientation can be carried out by lateral displacement of the coupling member, as opposed to rotation thereof. For example, the opening can be formed with a narrow portion, in which the coupling member cannot be rotated. Lateral displacement of the coupling member into the narrow portion retain the coupling member in the desired orientation.

The coupling member 30 can further includes a second flange 46 disposed about a location along the length of the elongated body, and having at least one dimension larger than the opening 12, such that it abuts against the perimeter of thereof. According to the illustrated example the second flange is a circular flange having a diameter larger that the opening 12. This way, the first flange 40 of the coupling member 30 can be inserted through the opening 12, at least in a first orientation, while the second flange 46 cannot be inserted therethrough in either orientations. Accordingly, the first flange 40 can be inserted through the opening 12, until the second flange 46 abut against a first surface 14*a* of the wall portion 14. Rotation of the coupling member 30 to the second orientation of the first flange 40 with respect to the causes the corners 42 of the first flange 40 to abut against a second surface 14*b* of the wall portion 14. As a result, in the second orientation, the wall portion 14 is secured between the first flange 40 and the second flange 46 of the coupling member 30, coupling thereby the filtering cup 20 to the wall portion. According to other examples, the coupling member 30 can be configured without a second flange, such that the wall portion 14 is secured between the first flange 40 and the edge 25 of the cup 20 when the cup is fastened to the coupling member 30.

The coupling member 30 further includes at least one fastening member 50 defined on the second flange 46 and protruding towards the first flange 40. The fastening member 50 can include a flexible arm 52 coupled to the second flange 46, for example on one or two side of the circumference thereof, and a stop member 54 downwardly protruding therefrom.

The stop member 54 is disposed such that when the first flange 41) of the coupling member 30 is inserted through the opening 12, and the second flange 46 abuts the perimeter thereof, the stop member 54 engages the perimeter of the opening 12 in the first orientation of the coupling member 30, and is urged into the opening 12 in the second orientation of the coupling member 30. The fastening member 50 can further include a raised portion 56 defined on the flexible arm 52 and protruding upwardly in an opposite direction from the stop member 54.

According to the illustrated example the coupling member 30 includes two fastening members 50 each defined on one side thereof. Each of the fastening members 50 can be defined on a location of the second flange 46 corresponding to substantially the middle of one side of the square flange 40. That is to say, each of the fastening members 50 can be disposed on the second flange 46 in a location corresponding to a location of the square flange 40 between two corners 42 thereof. In the second orientation of the coupling member 30, each of the stop members 54 can be configured to engage a corner of the opening 12, as explained hereinafter.

It is appreciated that the coupling member 30 can include four fastening members 50 each disposed on a location on the second flange 46 corresponding to one side of the square flange 40. Each of the stop members 54 can be configured to engage one of the corners of the opening 12.

It is further appreciated that the fastening members 50 according to other examples can be mounted on the elongated body 35 as opposed to the second flange 46. The fastening member 50 are so disposed such that the stop members 54 can enter the opening 12, at least in the second orientation of the coupling member 30.

As explained herein above coupling the coupling member 30 to the filtering cup 20 is carried out by rotation thereof with respect to one another such the screw thread 34 defined on an outer surface of the coupling member 30 engages a corresponding screw thread 26 defined on an inner surface of the filtering cup 20. According to an example, the filtering cup 20 and the coupling member 30 further include an anti-reverse mechanism configured to preclude back rotation of the filtering cup 20 in a direction to unscrew the screw threads 34 and 26. According to an example the anti-reverse mechanism includes a plurality of triangular protrusions 48 defined about the circumference of the second flange 46 and corresponding protrusions 23 on an inner portion of at the edge 25 of the filter cup 20.

When the filtering cup 20 is coupled to the coupling member 30 the circumference of the second flange 46 and the triangular protrusions 48 thereon engages the inner portion at the edge 25 of the filter cup 20 and the protrusions 23 thereon. The triangular protrusions 48 thus preclude an undesired rotation of the filter cup 20 with respect to the coupling member 30. According to an example the triangular protrusions 48 can include a side having a moderate slope and a side having a sharp slope, the moderate slop can be disposed along the direction of closing rotation of the filter cup 20, such as the clockwise direction, while the relatively sharp slope can be disposed in the direction of opening rotation thereof, such as the counterclockwise direction. This way the moderate slope facilitate coupling the filter cup 20 to the coupling member 30, and the sharp slope renders the undesired rotation and uncoupling thereof difficult.

Attention is now directed to FIGS. 4A and 4B, the filter cup 20 can be disposed over the coupling member 30, and rotated about half way through the screw thread 34, such that the filter cup 20 is coupled to the coupling member 30 however the edge 25 thereof does not engage the second flange 46. The coupling member 30 is disposed in a first orientation thereof such that the first flange 40 thereof can be inserted through the opening 12 of the wall portion 14 disposed between the first reservoir and the second reservoir (not shown). At this position the shape of the first flange, for example square is aligned with the shape of the opening 12, thus displacement of the first flange 40 through the opening 12 is possible.

Once the first flange 40 through the opening 12 the fastening member 50 are aligned with the perimeter of the wall portion 14 such that stop member 54 engage a first surface 14a of the wall portion. Thus, further rotation of the filter cup 20 with respect to the coupling member 30 brings causes the shoulder portion 28 to engage the raised portion 56 of the fastening member 50. At this point, further rotation of the filter cup 20 with respect to the coupling member 30 is substantially stopped by the friction between raised portion 56 and the shoulder portion 28.

As shown in FIGS. 5A and 5B, further rotation of the filtering cup 20 in the same direction, i.e. clockwise direction, causes the coupling member 30 to rotate therewith and to thereby shift to the second orientation thereof. As a result the first flange 40 is disoriented with respect to the opening 12, i.e. the square flange is no longer aligned with the square opening 12 such that the corners 42 thereof engage the second surface 14b of the wall portion 14 thereby blocking the displacement of the first flange 40 out of the opening 12. In addition, in the orientation the fastening member 50 are disposed aligned with a portion of the opening, i.e. one if the corners thereof. Thus, the stop member 54 of each of the fastening member 50 can engage a wall portion of the inner circumference of the opening 12, i.e. the corners thereof.

Figure 6C:
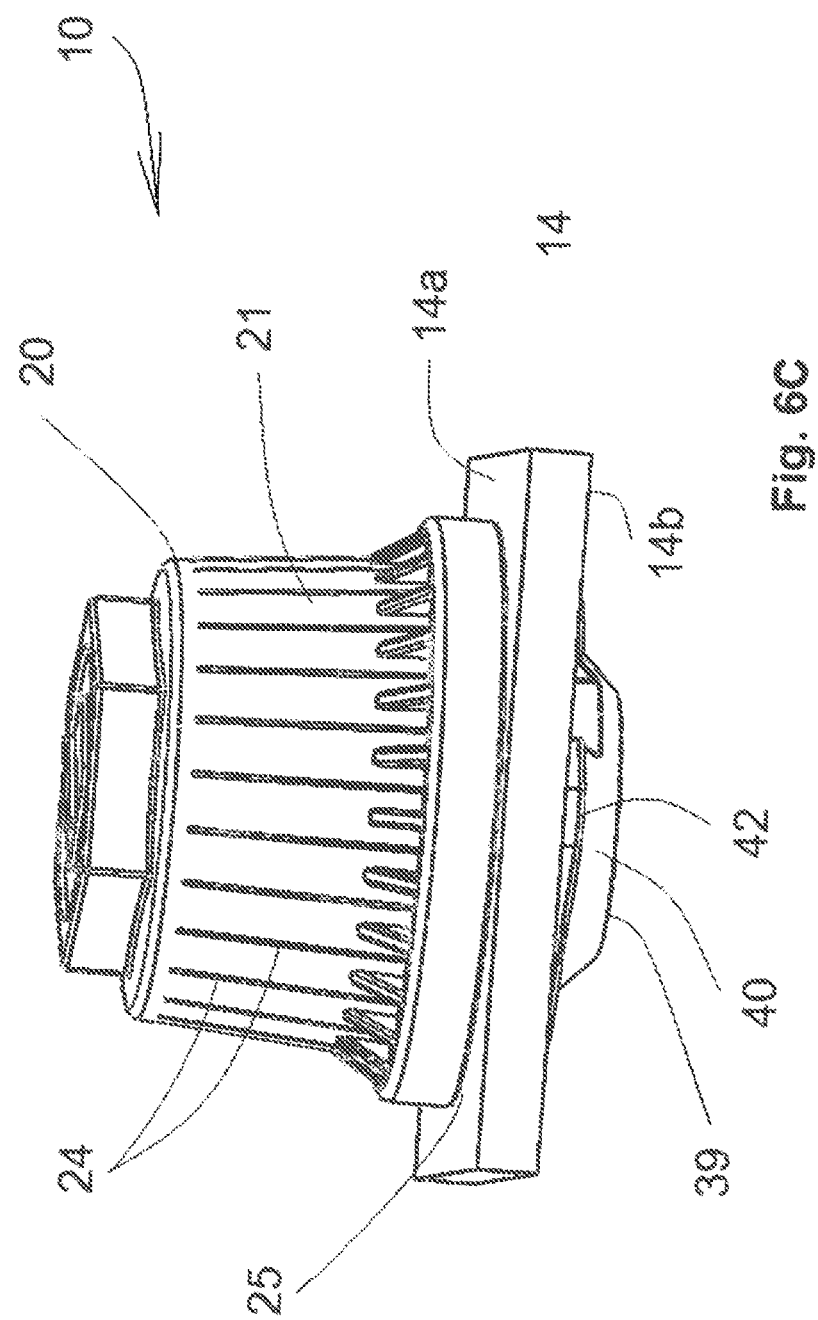
FIG. 6C is a perspective view of the filter of FIG. 1, in the secured position thereof.

Attention is now directed to FIGS. 6A to 6C, further rotation of the filtering cup 20 in the same direction with respect to the coupling member 30 causes the screw threads 34 and 26 to further fasten, such that the edge 25 of the conical wall of the filtering cup 20 engages the first surface 14a of the wall portion 14, and the shoulder portion 28 engages the raised portion 56 and thus urges the flexible arm 52 downwardly, such that the stop member 54 is pushed into the opening 12.

It will be appreciated by those skilled in the art that although in the illustrated example the fastening member 50 are flexibly defined, according to other examples the fastening member 50 can be rigid members defined such that upon rotation of the coupling member 30 they are inserted into the opening 12 allowing thereby engagement of the stop member 54 with an inner wall portion of the opening 12.

The flexible arms of the illustrated example however allow coupling the filter 10 to different wall portions having various thicknesses. That is to say, in case the filter 10 is coupled to a relatively thick wall portion, the first flange 40 is inserted through the opening 12 and the first surface 14a urges the flexible arms of the fastening member 50 upwardly. When the coupling member 30 is rotated to the second orientation thereof the fastening member 50 are aligned with the opening 12 such that the fastening member 50 are biased back therein such that the stop members 54 engages an inner wall portion of the opening 12.

Similarly, in case the filter 10 is coupled to a relatively thin wall portion the fastening member 50, even in the second orientation thereof the stop member 54 of the fastening member 50 may not be forced into the opening 12. Thus the flexible arms can be urged downwardly by the shoulder portion 28 pushing the raised portion 56. This way, the stop members 54 are urged into the opening 12 engaging thereby a side wall thereof.

As best seen in FIG. 6B, further rotation of the coupling member 30 is now precluded by the engagement of the stop member 54 with an inner wall portion of the opening 12, here illustrated as the corner of thereof. Accordingly, the filtering cup 20 can be further fastened to the coupling member 30 by clockwise rotation thereof, the coupling member 30 is however held in place by the stop member 54 maintaining thereby the second orientation thereof.

Accordingly, the filtering cup 20 can be further fastened to the coupling member 30, until the edge 25 thereof sealingly engages the first surface 14a of the wall portion 14.

It is appreciated that the structure of the filter allows mounting thereof on the wall portion 14 by continuously rotating the filtering cup 20 with respect to the coupling member 30, such that in the rotation fastens the filtering cup 20 to the coupling member 30 and also secures the coupling member 30 to the wall portion 14, by shifting thereof to the second orientation, and farther by maintaining the coupling member 30 in the second orientation.

The outlet port 39 can include a tapered wall portion, defined about the edge of the outer perimeter thereof, facilitating thereby the insertion thereof through the opening 12.

The filtering cup 20 can further be provided with a hexagonal head portion such that rotation thereof with respect to the coupling member 30 can be carried out by a corresponding tool.

Those skilled, in the art to which the presently disclosed subject matter pertains will readily appreciate that numerous changes, variations, and modifications can be made without departing from the scope of the invention, mutatis mutandis.

The invention claimed is:

1. A fluid flow accessory for controlling flow of fluids transferred between a first fluid containing structure and a second fluid containing structure through an opening formed in a wall portion disposed between the first and the second fluid containing structures and having a first surface facing the first fluid containing structure and a second surface facing the second fluid containing structure, the fluid flow accessory comprising:
    a cup having an edge configured to engage the first surface of the wall portion; and
    a coupling member including coupling arrangement configured for coupling to said cup and a first flange configured to be inserted through the opening in a first orientation thereof with respect to the opening, and for abutting against the second surface of the wall portion in a second orientation thereof with respect to the opening, and a fastening member protruding towards the first flange and being disposed such that in the second orientation it engages a segment of the wall portion thereby limiting the displacement of the coupling member into said first orientation,
    wherein said coupling arrangement is configured for threaded engagement between said cup and said coupling member,
    and wherein said cup includes a shoulder portion defined about an inner edge thereof, and being configured to urge said fastening member towards the first flange when said cup is fastened to said coupling member, such that in said second orientation said fastening member engages an inner edge of the opening, precluding thereby the displacement of said first flange back to said first orientation.

2. The fluid flow accessory of claim 1 wherein said coupling member is selectively shifted between said first orientation and said second orientation by rotation thereof when disposed inside the opening.

3. The fluid flow accessory of claim 1 wherein in said second orientation, and after tightening of said threaded engagement, the wall portion is pressed between said first flange of said coupling member and said edge of said cup.

4. The fluid flow accessory according to claim 1 wherein said cup includes a filtering surface configured to filter fluid.

5. The fluid flow accessory of claim 4 wherein said filtering surface is configured to block gravel of a gravel filter from entering the second fluid containing structure.

6. The fluid flow accessory of claim 1 wherein said edge is configured to sealingly engage the wall portion.

7. The fluid flow accessory according to claim 1 wherein said shoulder portion includes a plurality of ribs defined along an inner surface of said cup.

8. The fluid flow accessory according to claim 1 wherein said first flange is shaped such that in said second orientation the first flange projects out of the perimeter of the opening.

9. The fluid flow accessory according to claim 8 wherein said shape has at least one corner and is sized such that in said first orientation said first flange can be inserted through the opening and in said second orientation said corner projects out the perimeter of the opening.

10. The fluid flow accessory according to claim 1 wherein said fastening member includes a flexible arm coupled to said coupling member, and a stop member downwardly protruding from said flexible arm such that in said first orientation said stop member can be urged upwardly by the first surface of the wall portion.

11. The fluid flow accessory according to claim 10 wherein said first flange is in the form of a square, and the opening is in the form of a corresponding square and wherein said stop member is configured to engage, in said second orientation, a corner of the opening.

12. A method for installing a fluid flow accessory for filtering fluids transferred between a first fluid containing structure and a second fluid containing structure through an opening formed in a wall portion disposed between the first and the second fluid containing structures and having a first surface facing the first fluid containing structure and a second surface facing the second fluid containing structure, the method comprising:
   providing the fluid flow accessory of claim 1;
   coupling said coupling member to said cup;
   inserting said first flange into the opening while said first flange is in said first orientation; and,
   rotating said cup in a direction such that said first flange is shifted to said second orientation and further rotating said cup in said direction until said fastening member engages said segment of the wall portion and said edge engages the first surface.

13. A fluid flow accessory for controlling flow of fluids transferred between a first fluid containing structure and a second fluid containing structure through an opening formed in a wall portion disposed between the first and the second fluid containing structures and having a first surface facing the first fluid containing structure and a second surface facing the second fluid containing structure, the fluid flow accessory comprising:
   a cup having an edge configured to engage the first surface of the wall portion; and
   a coupling member including coupling arrangement configured for coupling to said cup and a first flange configured to be inserted through the opening in a first orientation thereof with respect to the opening, and for abutting against the second surface of the wall portion in a second orientation thereof with respect to the opening, and a fastening member protruding towards the first flange and being disposed such that in the second orientation it engages a segment of the wall portion thereby limiting the displacement of the coupling member into said first orientation,
   wherein said fastening member is defined on a second flange laterally protruding from said coupling member and configured to abut against the first surface of the wall portion, precluding thereby further insertion of said coupling member through the opening.

14. The fluid flow accessory according to claim 13 wherein said coupling member includes an elongated body configured to be inserted inside said cup and having a screw thread defined on a surface thereof, said screw thread being configured to engage a corresponding screw thread defined on an inner surface of said cup.

15. The fluid flow accessory according to claim 14 wherein said elongated body includes a head portion configured to protrude out of said cup such that coupling said coupling member to said cup can be carried out by rotation of said head with respect to said cup.

16. The fluid flow accessory according to claim 14 wherein said cup and said coupling member further include an anti-reverse mechanism configured to preclude back rotation of said cup in a direction to unscrew said screw thread.

17. A fluid flow accessory for controlling flow of fluids transferred between a first fluid containing structure and a second fluid containing structure through an opening formed in a wall portion disposed between the first and the second fluid containing structures and having a first surface facing the first fluid containing structure and a second surface facing the second fluid containing structure, the fluid flow accessory comprising:
   a cup having an edge configured to engage the first surface of the wall portion; and
   a coupling member including coupling arrangement configured for coupling to said cup and a first flange configured to be inserted through the opening in a first orientation thereof with respect to the opening, and for abutting against the second surface of the wall portion in a second orientation thereof with respect to the opening, and a fastening member protruding towards the first flange and being disposed such that in the second orientation it engages a segment of the wall portion thereby limiting the displacement of the coupling member into said first orientation,
   wherein said coupling member includes an elongated body configured to be inserted inside said cup and having a screw thread defined on a surface thereof, said screw thread being configured to engage a corresponding screw thread defined on an inner surface of said cup,
   and wherein said anti-reverse mechanism includes a plurality of protrusions defined about the circumference of a second flange of said coupling member configured to engage corresponding protrusions defined on an inner portion of said cup.

18. A fluid flow accessory for controlling flow of fluids transferred between a first fluid containing structure and a second fluid containing structure through an opening formed in a wall portion disposed between the first and the second fluid containing structures and having a first surface facing the first fluid containing structure and a second surface facing the second fluid containing structure, the fluid flow accessory comprising:

a cup having an edge configured to engage the first surface of the wall portion; and a coupling member including coupling arrangement configured for coupling to said cup and a first flange configured to be inserted through the opening in a first orientation thereof with respect to the opening, and for abutting against the second surface of the wall portion in a second orientation thereof with respect to the opening, and a fastening member protruding towards the first flange and being disposed such that in the second orientation it engages a segment of the wall portion thereby limiting the displacement of the coupling member into said first orientation, wherein said fastening member includes a flexible arm coupled to said coupling member, and a stop member downwardly protruding from said flexible arm such that in said first orientation said stop member can be urged upwardly by the first surface of the wall portion, and wherein said flexible arm includes a raised portion protruding therefrom in an opposite direction from said stop member, such that when said cup is tightened onto said coupling member said raised portion is urged by a shoulder portion of said cup towards said first flange.

\* \* \* \* \*